United States Patent
Zhao

(10) Patent No.: US 11,852,040 B2
(45) Date of Patent: Dec. 26, 2023

(54) METHOD OF AUTOMATIC LOAD REGULATION, OPERATION AND PROTECTION FOR STEAM TURBINE AND MOTOR COMBINED DRIVE AND POWER GENERATION IN CONVERTER SATURATED STEAM UTILIZATION

(71) Applicant: HAINAN JIRUI HAOHAN POWER SYSTEM TECHNOLOGY CO., LTD., Haikou (CN)

(72) Inventor: Zhen Zhao, Haikou (CN)

( * ) Notice: Subject to any disclaimer, the term of this patent is extended or adjusted under 35 U.S.C. 154(b) by 0 days.

(21) Appl. No.: 18/326,742

(22) Filed: May 31, 2023

(65) Prior Publication Data

US 2023/0304421 A1    Sep. 28, 2023

Related U.S. Application Data

(63) Continuation of application No. PCT/CN2022/089404, filed on Apr. 26, 2022.

(30) Foreign Application Priority Data

Jul. 20, 2021   (CN) .......................... 202110818506.3

(51) Int. Cl.
    *F01K 13/02*    (2006.01)
    *F01D 15/10*    (2006.01)
    *F01D 15/12*    (2006.01)

(52) U.S. Cl.
    CPC .............. *F01K 13/02* (2013.01); *F01D 15/10* (2013.01); *F01D 15/12* (2013.01); *F05D 2220/31* (2013.01); *F05D 2260/40* (2013.01)

(58) Field of Classification Search
    CPC .................................. F01K 13/00; F01K 13/02
    See application file for complete search history.

(56) References Cited

FOREIGN PATENT DOCUMENTS

| CN | 109268079 A | 1/2019 |
| CN | 109519232 A | 3/2019 |
| CN | 110056401 A | * 7/2019 |
| CN | 112727788 A | 4/2021 |
| CN | 112879109 A | 6/2021 |
| CN | 113389604 A | 9/2021 |

OTHER PUBLICATIONS

International Search Report and Written Opinion regarding PCT/CN2022/089404 from WIPO.

* cited by examiner

*Primary Examiner* — Laert Dounis

(57) ABSTRACT

A method of automatic load regulation, operation and protection for steam turbine and motor combined drive and power generation in converter saturated steam utilization, which relates to the technical field of low-pressure saturated steam utilization, to solve the problems of steam instability, low energy utilization efficiency, and unstable system operation in existing technique. Technical points: S1. setting engagement speed; S2. speed control mode; S3. switching to a valve control mode after successfully engagement; S4. valve position automatic mode activation; S5. entering automatic mode; S6. reducing the valve position adjustment rate; S7. reading, by the DCS of the drive steam turbine system, the comprehensive thermal storage index value and the preset valve position corresponding to the thermal storage value; adjusting the valve position to the valve position corresponding to the read heat storage value.

10 Claims, 2 Drawing Sheets

METHOD OF AUTOMATIC LOAD REGULATION, OPERATION AND PROTECTION FOR STEAM TURBINE AND MOTOR COMBINED DRIVE AND POWER GENERATION IN CONVERTER SATURATED STEAM UTILIZATION

CROSS-REFERENCE

This application is a continuation of International Application No. PCT/CN2022/089404 with a filling date of Apr. 26, 2022, designating the United States, and further claims to the benefit of priority from Chinese Application No. 202110818506.3 with a filing date of Jul. 20, 2021. The content of the aforementioned applications, including any intervening amendments thereto, are incorporated herein by reference.

TECHNICAL FIELD

The present disclosure relates to a control method of saturated steam turbine and motor combined drive power generation, in particular to a method of automatic load regulation, operation and protection for steam turbine and motor combined drive and power generation in converter saturated steam utilization, which relates to the technical field of low-pressure saturated steam utilization.

BACKGROUND

How to efficiently utilize the low-pressure saturated steam generated by by-products in steel production has always been a concern and hope for steel enterprises to solve. The saturated steam recovered from the converter production in existing technique, except for some used for RH vacuum extraction, is all sent to the low-pressure steam pipeline network for domestic use, but has not been efficiently utilized. Taking a special steel enterprise as an example, with an annual output of 3 million tons, there are two RH vacuum equipment, one using a steam pump and the other using a mechanical pump. The vacuum rate of the product is about 85%, the saturated steam generated by the converter has an hourly flow rate of about 28 tons, and the steam for RH vacuum extraction has an hourly flow rate of about 12 tons which is supplied to the steam pipeline network through two 80 m3 heat accumulators. Due to the discontinuity of converter production, the periodicity of saturated steam production, and the discontinuity of RH steam consumption (approximately 1 converter every 40 minutes, with 13 minutes of steam consumption per converter and no steam consumption for the rest of the time), it results in unstable pressure and flow in the low-pressure saturated steam system. Converter steam only supplies normal steam consumption for RH, while the rest is discharged into the low-pressure steam pipeline network for domestic use, but has not been effectively utilized.

Under the current pressure of energy conservation and consumption reduction in steel enterprises, utilizing the surplus saturated steam from the converter to construct efficient drive steam turbines has become a new approach to energy conservation and consumption reduction. However, due to factors such as high moisture content and significant pressure fluctuations in the saturated steam of the converter, it has been difficult to control the speed of the drive steam turbine driven by the saturated steam of the converter in the past, leading to tripping of the coaxial drag motor, and affecting the normal production and operation of the driven fan.

Furthermore, steam accumulators are widely used as auxiliary equipment in the thermal power industry. Steam accumulators are generally used after steam sources with unstable pressure or flow rate to stabilize steam flow and pressure. At present, the regulation of steam accumulators generally adopts a regulation system composed of mechanical check valves and steam outlet control valves, and there are also widespread errors or unreasonable situations in the connection of the accumulator pipeline. Based on the above reasons, there are heat accumulators with poor heat storage efficiency and unstable outlet steam flow in current widespread applications.

Based on the above, due to the discontinuity of steam consumption for RH in steelmaking, steam consumption of RH and steam turbine are taken from low-pressure steam main pipelines with stable pressure after being regulated by heat accumulators. Therefore, the operation of the steam turbine requires periodic and continuous regulation of output power based on the excess saturated steam volume. It is necessary to ensure the steam consumption of RH while making full use of saturated steam as much as possible, avoiding the phenomenon of steam evacuation and dissipation, thus thoroughly solving the problems of steam instability, low energy utilization efficiency, and unstable system operation.

SUMMARY

A brief overview of the present disclosure is provided below in order to provide a basic understanding of certain aspects of the present disclosure. It should be understood that this overview is not an exhaustive overview of the present disclosure. It is not intended to determine the essential or important parts of the present disclosure, nor is it intended to limit the scope of the present disclosure. The purpose is only to provide certain concepts in a simplified form as a prelude to a more detailed description to be discussed later.

In view of this, in response to the problems of unstable steam, low energy utilization efficiency, and unstable system operation in existing technique, the present disclosure provides a method of automatic load regulation, operation and protection for steam turbine and motor combined drive and power generation in converter saturated steam utilization. The turbine load of drag turbine is automatically adjusted based on the amount of steam stored in the heat storage device, so as to ensure the steam consumption for RH production. It also maximizes the utilization of surplus steam, achieving significant energy-saving effects and stable operation.

In order to realize the above objects, a method of automatic load regulation, operation and protection for steam turbine and motor combined drive and power generation in converter saturated steam utilization is provided by the present disclosure, including:

Step S1: setting a clutch engagement speed in DEH of a steam turbine system;

Step S2, speed control mode; specifically, after regulating the speed to the clutch engagement speed through speed regulation, determining, by the DEH of the steam turbine system, whether a clutch is successfully engaged based on the clutch engagement speed or an opening of a steam inlet main regulating valve; if the clutch is successfully engaged, proceeding to step S3;

if not, setting the turbine speed to be lower than the clutch engagement speed, proceeding to step S1;

Step S3: switching to a valve control mode after the clutch is successfully engaged, setting a valve position of an initial steam inlet main regulating valve to be 2%-4% higher than a clutch engagement valve position, at this time, a system is successfully started and enters into a valve-position-control-turbine-output-power mode;

Step S4: activating a valve position automatic control mode, specifically by activating a function button;

Step S5: clicking an "automatic input" function button to enter the valve position automatic control mode to automatically adjust a valve position according to a comprehensive thermal storage index value;

Step S6: reducing a valve position adjustment rate;

Step S7: automatically adjusting, by the steam turbine, the valve position to achieve a purpose of automatically regulating an output power based on the comprehensive thermal storage index value of a heat storage system, specifically:

Step S71: establishing a hard wiring communication between a PLC of the heat storage system and a DCS of the steam turbine system, and reading, by the DCS of the steam turbine system, the comprehensive thermal storage index value;

Step S72: reading, by the DCS of the steam turbine system, a preset valve position corresponding to the comprehensive thermal storage index value;

Step S73: adjusting the valve position of the steam inlet main regulating valve to the read valve position corresponding to the comprehensive thermal storage index value;

Step S74: transmitting an output frequency value, an output power value, and a frequency transformer tripping signal of the frequency transformer PLC to the DCS of the steam turbine system through a hard wiring communication; when work done by the steam turbine system exceeds power consumption of the fan, the frequency transformer automatically switches to a power generation mode; when the work done by the steam turbine system is less than the power consumption of the fan, the frequency transformer automatically switches to a power supply mode;

Step S8, clicking a "manual" function button, if yes, executing step S9, if not, executing step S7 and step S8 again;

Step S9: increasing the valve position adjustment rate;

Further, in step S2, the clutch engagement speed is set to a current fan speed×8+(60-100) r/min.

Further, in step S2, determine successful engagement of the clutch when the turbine speed exceeds the set clutch engagement speed by 2%-5% or the opening of the steam inlet main regulating valve of the steam turbine is between 12%-18%.

Further, in step S2, when the turbine speed is 2%-5% lower than the set clutch engagement speed, and proceeding to step S1.

Further, an inlet parameter protection of the steam turbine: in step S3, under the valve control mode, if pressure in front of the steam inlet main regulating valve exceeds a fluctuation range of 0.9-1.1 MPa during a process, sending an alarm; if the pressure in front of the steam inlet main regulating valve exceeds the fluctuation range of 0.8-1.2 MPa, stopping the system automatically.

Further, a speed protection of valve control regulation: in step S3, under the valve control mode, if the turbine speed is lower than 2%-5% of the clutch engagement speed, the valve control mode is immediately exited and the speed control mode is returned, the turbine speed is set to 2%-5% of the clutch engagement speed, sending an alarm for clutch failure or automatic shutting down. Further, a rate protection of valve control regulation: in step S4, if the valve position adjustment enters into the valve position automatic control mode, the valve position adjustment rate is reduced by half to prevent regulation oscillation and other unexpected situations from occurring; on the contrary, in step S8, when entering manual mode, returning to 5% of the regulation rate value.

Further, a switching protection of regulation mode: in step S3, the regulation mode is switched to the valve position adjustment mode according to a determination of successful clutch engagement; if the clutch fails to engage successfully, the regulation mode is returned to the speed control mode, automatically setting a speed that is 2%-5% lower than a grid speed-clutch engagement speed, canceling an "engaged" state to prevent the system from automatically detecting and setting the "engaged" state again, and then automatically entering the valve position adjustment mode again.

Further, in step S7, a power-valve position curve is drawn, and a maximum control valve position and a minimum control valve position are set according to the power-valve position curve; then setting 5-8 valve positions, corresponding to 5-8 intervals of the comprehensive thermal storage index value; the maximum control valve position corresponds to a high comprehensive thermal storage index value and the maximum control valve position ensures that the steam turbine is not overloaded; and the minimum control valve position ensures that the turbine speed does not decrease and prevents clutch disengagement.

Further, in step S7, an effectiveness judgment whether driving parameters is required to adjust is conducted, that is, after reading the comprehensive thermal storage index value, first determining whether the comprehensive thermal storage index value is between 1.0-1.9 MPa, if yes, subsequent regulation control continues, otherwise the automatic regulation mode is exited, and reporting an error.

Further, in step S3, every time the steam turbine is started and enters a "running" state, a power value transmitted by the frequency transformer is read and recorded; after entering the "engaged" state, the recorded power value subtracts a real-time power value transmitted by the frequency transformer (when generating electricity in reverse, the output power value is negative) to obtain an output power value of the steam turbine, and display this value on the steam turbine as the output power value of the drive steam turbine.

The above values are an example of the application of this disclosure, which is convenient for illustrating the control methods and steps of this disclosure. The protection scope of this disclosure is not limited to the above numerical range.

The effect achieved by the present disclosure is shown as following:

The method of automatic load regulation, operation and protection for steam turbine and motor combined drive and power generation in converter saturated steam utilization of the present disclosure adopts the most direct and reliable valve position automatic regulation mode. The regulating drive also takes the comprehensive thermal storage index value of the heat storage system that can directly reflect the power capacity of the steam system. Through practical operation and continuous optimization of parameters, currently, the drive steam turbine can automatically adjust the turbine load based on the amount of steam stored in the heat storage system, achieving the goal of ensuring RH production steam consumption and maximizing the utilization of surplus steam, which has an obvious energy-saving effect and stable operation. By using this method, the steam turbine and the synchronous clutch operate stably without affecting the operation of the dust removal fan, and the dust removal fan operates normally at 46.5 Hz with a power of around 1530 kw. When the steam flow rate reaches 10.5 t/h, the reverse power generation function of asynchronous motor can be achieved through the frequency transformer. When the turbine load of the steam turbine exceeds 70%, the steam consumption of the steam turbine reaches 6.8 kg/kwh. When the steam flow rate reaches 21.8 t/h with the pressure 1.03 MPa, the power of the steam turbine reaches 3340 kw, the motor power generation load reaches 1802 kw, and the steam consumption of the steam turbine is only 6.52 kg/kwh. The electricity price is calculated at 0.6 yuan/kwh, and the 1 ton low calorific value saturated steam generated by the converter can recover 88 yuan, which exceeds the expected effect. Under normal circumstances, the steam flow rate of the converter is about 16 tons per hour, and the maximum hourly flow rate reaches about 28 tons. Based on this calculation, 1408-2464 yuan can be recovered per hour, and huge profits will be obtained over time. In addition to meeting the steam consumption for RH production, the present disclosure can increase the annual electricity saving income of the steam turbine by approximately 9.3648 million yuan. After deducting the operating cost of 1.7642 million yuan, the annual income is 7.606 million yuan.

DETAILED DESCRIPTION OF THE EMBODIMENTS

In the following text, exemplary embodiments of the present disclosure will be described in conjunction with the accompanying drawings. For clarity and conciseness, not all features of the actual implementation is described in the specification. However, it should be understood that many specific decisions must be made in the development of any such practical implementation in order to achieve the specific goals of the developer, such as meeting the constraints related to the system and business, which may vary depending on the implementation method. In addition, it should be understood that although development work may be very complex and time-consuming, for those skilled in the art who benefit from the disclosed content of the present disclosure, such development work is only a routine task.

The skilled person in the art can understand that, unless otherwise defined, all terms used here (including technical and scientific terms) have the same meaning as those generally understood by ordinary skilled in the art to which the present disclosure relates. It should also be understood that terms such as those defined in a general dictionary should be understood to have meanings consistent with those in the context of existing technology, and unless defined as such, they will not be interpreted with idealized or overly formal meanings.

Here, it should also be noted that in order to avoid blurring the present disclosure due to unnecessary details, only the device structure and/or processing steps closely related to the solution according to the present disclosure are shown in the accompanying drawings, while other details that are not closely related to the present disclosure are omitted. The preferred embodiments of the present disclosure are elaborated in detail below based on the accompanying drawings.

In order to make the above purposes, features, and advantages of the present disclosure clearer and easier to understand, a special steel enterprise with an annual output of 3 million tons is taken as an example, and further detailed explanations of the present disclosure are provided in conjunction with the accompanying drawings.

Figure 1:
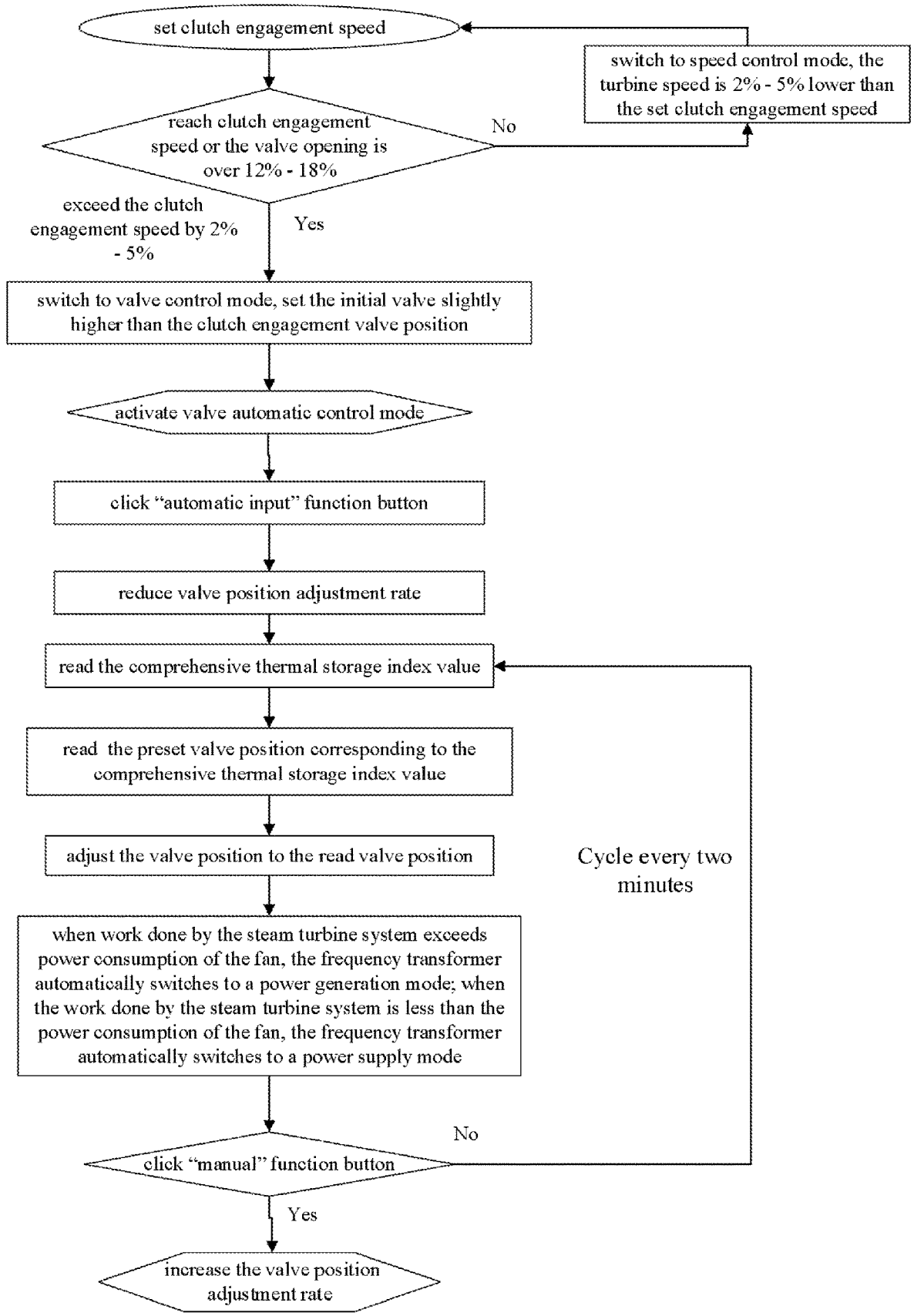
FIG. 1 is a flowchart of the present disclosure.

A method of automatic load regulation, operation and protection for steam turbine and motor combined drive and power generation in converter saturated steam utilization (refer to FIG. 1) of the present embodiment, including:

Step S1: setting a clutch engagement speed in DEH of a drive steam turbine system;

Step S2, speed control mode; specifically, after regulating the speed to the clutch engagement speed through speed regulation, determining, by the DEH of the steam turbine system, whether a clutch is successfully engaged based on the clutch engagement speed or an opening of a steam inlet main regulating valve; if the clutch is successfully engaged, proceeding to step S3; if not, switching to speed control, and setting the turbine speed to be lower than the clutch engagement speed, then proceeding to step S1;

Step S3: switching to a valve control mode after the clutch is successfully engaged, setting a valve position of an initial steam inlet main regulating valve to be 2% -4% higher than a clutch engagement valve position, at this time, the system is successfully started and enters into a valve-position-control-turbine-output-power mode;

Step S4: activating a valve position automatic control mode, specifically by activating a function button;

Step S5: clicking an "automatic input" function button to enter the valve position automatic control mode to automatically adjust a valve position according to a comprehensive thermal storage index value;

Step S6: reducing a valve position adjustment rate;

Step S7: automatically adjusting, by the steam turbine, the valve position to achieve a purpose of automatically regulating an output power based on the comprehensive thermal storage index value of a heat storage system, specifically:

Step S71: establishing a hard wiring communication between a PLC of the heat storage system and a DCS of the steam turbine system, and reading, by the DCS of the steam turbine system, the comprehensive thermal storage index value;

Step S72: reading, by the DCS of the steam turbine system, a preset valve position corresponding to the comprehensive thermal storage index value;

Step S73: adjusting the valve position of the steam inlet main regulating valve to the read valve position corresponding to the comprehensive thermal storage index value;

Step S74: transmitting an output frequency value, an output power value, and a frequency transformer tripping signal of the frequency transformer PLC to the DCS of the steam turbine system through a hard wiring communication; when work done by the steam turbine system exceeds power consumption of the fan, the frequency transformer automatically switches to a power generation mode; when the work done by the steam turbine system is less than the power consumption of the fan, the frequency transformer automatically switches to a power supply mode;

Step S8, clicking a "manual" function button, if yes, executing step S9, if not, executing step S7 and step S8 again;

Step S9: increasing the valve position adjustment rate.

Figure 2:
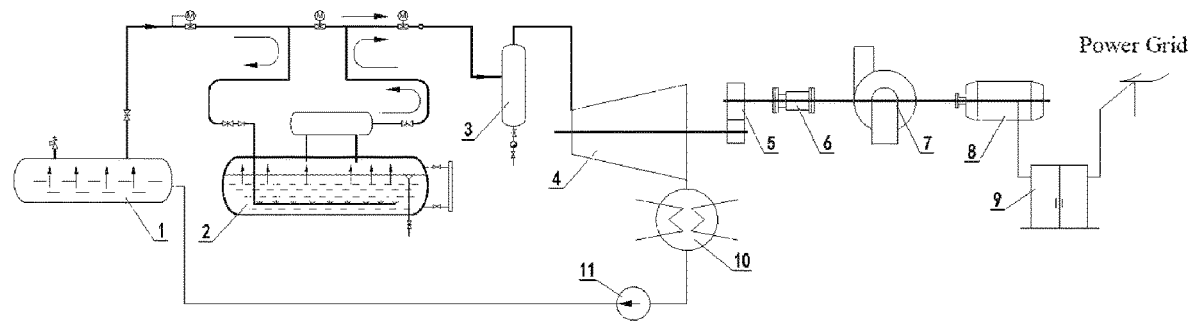
FIG. 2 is a block diagram of the converter saturated steam turbine and motor combined drive power generation system.

A converter saturated steam turbine and motor combined driving power generation system to realize the above method (refer to FIG. 2), including a converter drum 1, a steam accumulator 2, a steam water separator 3, a steam turbine 4, a gearbox 5, the clutch 6, the fan 7, an asynchronous motor 8, the frequency transformer 9, a condenser 10, and a water pump 11. The converter drum 1, the steam accumulator 2, the steam water separator 3, the steam turbine 4, the condenser 10, and the water pump 11 are connected in sequence through a circulating pipeline, with valve components arranged on corresponding pipelines. The steam turbine 4 is sequentially connected to the gearbox 5, the clutch 6, the fan 7, and the asynchronous motor 8. And the frequency transformer 9 is connected to the asynchronous motor.

The operation of the drive steam turbine of the present disclosure requires periodic continuous regulation of output power based on the surplus saturated steam volume. It is necessary to ensure the steam consumption of RH and make full use of saturated steam as much as possible, without the phenomenon of steam evacuation and dissipation.

There is a huge difference between this disclosure and the traditional power generation:

(1) The steam turbine must be in a constant regulation of the variable operating condition to regulate peak shaving and valley filling of the steam system, instead of conventional power plants regulating output power based on stable boiler load and main steam pressure.

(2) The pressure of the steam turbine inlet main pipe is in joint control through the regulating valve group at the outlet of the heat accumulator, and the pressure fluctuation is relatively small, and it is not related to the steam storage capacity of the converter heat accumulator system.

Therefore, the present disclosure cannot use traditional power generation mode to control the operation of steam turbines, as it is a reliable and stable automatic regulation method.

The requirements of the present disclosure for operating personnel: there are no professional thermal and power generation operating personnel in existing steelmaking plants, if only one dust removal operator currently equipped is in charge of the operation, it will not only fail to adjust the turbine operation in time, but also bring unpredictable consequences. Therefore, the automatic regulation and protection of the present disclosure are even more important and necessary.

In order to meet the RH steam consumption, the low-pressure saturated steam main pipe at the outlet of the heat accumulator in the present disclosure is set to a rated pressure of 1.0 MPa after being adjusted by the regulating valve group at the outlet of the heat accumulator. The normal fluctuation range of pressure is 0.9-1.1 MPa, and it will not change with the change of steam storage pressure inside the heat accumulator.

The evaluation index for the external steam supply capacity of the converter saturated steam system: the steam source of the converter saturated steam system is the vaporization cooling steam drum of the converter. The intermittent production of the converter determines the discontinuity of the steam production of each converter. Steam is generated during the oxygen blowing period of steel smelting in each converter, and there is no steam generated during the rest of the time. In order to ensure continuous supply of steam and stable pressure, a heat storage system has been provided. After the intermittent steam generated by the converter enters the heat accumulator for storage, the pressure inside the heat accumulator increases. When the heat accumulator supplies steam externally through the regulating valve, the pressure inside the heat accumulator slowly decreases. Therefore, the heat storage system calculates the comprehensive thermal storage index, which fluctuates between 1.0 and 1.9 MPa. After the comprehensive thermal storage index of the steam system is lower than 1.0 MPa, it is unable to supply steam to the external. After exceeding 1.9 MPa, it is unable to absorb the steam produced by the converter. Therefore, the system needs to maintain a comprehensive thermal storage index of around 1.45 MPa.

Between the heat storage system and the drive steam turbine system: In order to meet the needs of converter production and steam turbine operation, the hardwired communication between the heat accumulator PLC and the steam turbine DCS are established, transmitting the comprehensive thermal storage index value and the corresponding valve position signal to the steam turbine DCS.

Between the frequency transformer system and the traction steam turbine system: In order to better control and protect the traction steam turbine system and the fan system, the output frequency value, the output power value, and the frequency transformer tripping signal of the frequency transformer PLC have been transmitted to the traction turbine DCS through hard wiring communication.

The automatic regulation of the steam turbine of the present disclosure involves the selection of automatic regulation modes, including the DEH automatic regulation mode for the steam turbine, which includes speed regulation, valve position adjustment, power regulation, and pressure regulation.

According to the DEH setting, the speed regulation mode must be used when starting the turbine. After the turbine reaches the set speed, it can be switched to other regulation modes.

1. Speed Regulation

After the turbine speed of the drive steam turbine to reach the clutch engagement speed, the clutch engagement is equivalent to the completion of incorporating with power network. Continuing to increase the speed will only increase the power output of the steam turbine, but the actual speed will not increase due to the limitation of the motor current. Therefore, it is not suitable for frequent automatic regulation of variable working conditions.

2. Power Regulation

Due to the lack of a direct measurement method for the output power of the steam turbine, there may be significant errors in using power regulation. Moreover, the variation in output power also depends on the comprehensive thermal storage index value of the steam system, and the actual regulation is also the valve opening regulation. Therefore, this embodiment is not adopted.

3. Pressure Regulation

Due to the fact that the inlet pressure of the steam turbine cannot reflect the working capacity of the steam system, automatic regulation of the output power of the steam turbine cannot be achieved. If the pressure value of the comprehensive thermal storage index is automatically adjusted, the actual regulation is also the valve opening regulation, and there are also uncertain factors such as system out of control, so this embodiment will not be adopted.

As above, this embodiment adopts the most direct and reliable automatic valve position adjustment mode. The regulating drive also takes the comprehensive thermal storage index value that can directly reflect the working capacity of the steam system.

Secondly, automatic regulation logic and parameter settings

1. Automatic Regulation Logic

In the DEH of the steam turbine system, after regulating the turbine speed to reach the clutch engagement speed, DEH determines whether the clutch is successfully engaged based on the set clutch engagement speed value and the valve opening.

2. Parameter Settings

Automatic regulation mode requires a power-valve position curve, based on which the maximum and minimum control valve positions can be determined, setting 5 to 8 valve positions corresponding to 5 to 8 intervals of the thermal storage index values, and the maximum control valve position corresponds to a high thermal storage value. The maximum control valve position should ensure that the steam turbine is not overloaded, and the minimum control valve position should ensure that the turbine speed does not decrease and prevent clutch disengagement.

During the regulation process, it is necessary to adjust the effectiveness judgment of the driving parameters, that is, after reading the thermal storage index value, first determine whether the thermal storage index value is between 1.0-1.9 MPa. If so, continue with the subsequent regulation control, otherwise exit the automatic regulation mode and report an error.

The clutch engagement speed should be set to the current fan speed×8+80 r/min, ensuring that the clutch is in engagement.

3. Calculation and Display of Turbine Output Power

Every time the steam turbine is started and enters the "running" state, a power value transmitted by the frequency transformer is read and recorded. After entering the "engaged" state, subtract a real-time power value transmitted by the frequency transformer from the recorded power value (during reverse power generation, negative power value is output) to obtain an output power value of the steam turbine unit, and display this value above the reducer as the power output value of the steam turbine unit.

Furthermore, protective measures during the automatic regulation process of the steam turbine:

1. Inlet parameter protection of the steam turbine: In step 3, under the valve control mode, if pressure in front of the steam inlet main regulating valve exceeds a fluctuation range of 0.9-1.1 MPa during the process, an alarm should be triggered; if the pressure in front of the steam inlet main regulating valve exceeds the fluctuation range of 0.8-1.2 MPa, it should automatically shut down.
2. Speed protection of valve control regulation: In step 3, under the valve control mode, if the turbine speed is lower than the clutch engagement speed of 160 r/min during the process, it may be due to the clutch engagement failure, so that the valve control mode should be immediately exited and returned to the speed control mode, and the turbine speed should be set to the clutch engagement speed of –160 r/min, and an alarm should be triggered for the clutch failure or automatic shutdown.
3. Rate protection for valve control regulation: In step 4, if the valve position adjustment enters into the valve position automatic control mode, the valve position adjustment rate needs to be reduced by half to prevent regulation oscillation and other unexpected situations from occurring; on the contrary, in step 8, when entering manual mode, the valve position adjustment rate should be restored to 5%.
4. Switching protection of regulation mode: In step 3, the regulation mode is switched to the valve position adjustment according to a determination of successful clutch engagement. If the clutch fails to engage successfully, the regulation mode is necessary to return to the speed control mode, automatically setting the speed which is lower than the grid connected speed of –160 r/min, canceling the "engaged" state, to prevent the system from automatically detecting and setting to the "engaged" state again, and then automatically entering the valve position adjustment mode again.

The Energy-Saving Effect of this Embodiment

1. Main Energy Consumption Indicators (see Table 1)

After taking the above measures, good energy-saving effects can be achieved, so as to effectively improve the economic efficiency of the power plant, mainly reflected in the following indicators:

1) The average utilization of waste heat saturated steam in this project is 16.5 t/h, and the plant unit has a power output of 2151 kW.
2) Steam consumption rate of the plant unit: 7.67 g/kWh.
3) Comprehensive power consumption rate of the entire plant: 9.3%.
4) Annual savings of standard coal: 5931 t/a.

TABLE 1

Main Energy Consumption Indicators

| Serial Number | Item | Unit | 3 MW | |
|---|---|---|---|---|
| 1 | Waste heat steam volume | t/h | 16.5 | Average |
| 2 | Total steam intake of steam turbine | t/h | 16.5 | |
| 3 | Total power generation of steam turbine | kW | 2151 | Average |
| 5 | Power consumption of plant | kW | 200 | |
| 5 | Power consumption rate of plant | % | 9.3 | |
| 6 | Annual operating hours | h | 8000 | |
| 7 | Annual total power generation | $10^6$ kWh | 17.208 | |
| 8 | Annual total power saving | $10^6$ kWh | 15.608 | |
| 9 | Average steam consumption rate | kg/kW | 7.67 | |
| 10 | Calculation of standard coal consumption for power generation | g/kWh | 380 | |
| 11 | Annual saving of standard coal | t/a | 5931 | |

2. Investment Estimate and Static Economic Analysis

Static investment situation: The static investment for the renovation of the heat accumulator and pipeline system is about 6 million yuan, the static investment for the drive steam turbine system is about 7.6 million yuan, and the total static investment is 13.6 million yuan. The installed capacity of this project is 3000 kW, and the cost of kilowatts is 4533.3 yuan, and static economic evaluation are show as below (see Table 2).

TABLE 2

Estimation of Annual Operating Costs and Static Benefits

| Serial Number | Item | Value | Unit-price | Amount (10000 yuan) |
|---|---|---|---|---|
| First | Power saving income | | | |
| 1 | annual energy output (kWh) | $1720.8 \times 10^4$ | Annual operating time is calculated as 8000 h | |
| 2 | Self consumption (kWh) | $160 \times 10^4$ | Annual operating time is calculated as 8000 h | |
| 3 | Annual power savings (kWh) | $1560.8 \times 10^4$ | 0.6 yuan/kWh(excluding taxes) | 936.48 |
| | Total income | | | 936.48 |
| Second | Production costs | | | |
| 1 | Industry water (t) | $29.2 \times 10^4$ | 2.4 yuan/t | 70.08 |
| 3 | desalted water (t) | $0.4 \times 10^4$ | 8 yuan/t | 3.2 |
| 4 | Wages and benefits | 10 person | 60000 yuan/person per year | 60 |
| 6 | Major repair costs | | 2.5% | 22.5 |
| 7 | Material cost | | 6.0 yuan/MWh | 10.32 |
| 8 | Other costs | | 6.0 yuan/MWh | 10.32 |
| | Total | | | 176.42 |

According to Static Benefit Analysis:

The static investment amount is 13.6 million yuan. After construction, in addition to meeting the demand for RH production steam, the annual power saving and revenue increase of steam turbine driving is about 9.3648 million yuan. After deducting the operating cost of 1.7642 million yuan, the annual income is 7.606 million yuan. The static investment payback period is 1.79 years (excluding the construction period), and about 21.5 months (excluding the construction period) can recover all construction investment.

In summary, this embodiment has significant economic benefits.

The above embodiments are only used to illustrate the technical solution of the present disclosure, not to limit it. Although the present disclosure has been described in detail with reference to the aforementioned embodiments, the ordinary skilled person in the art should understand that they can still modify the technical solutions or equivalently substitute some or all of the technical features recorded in the aforementioned embodiments. And these modifications or substitutions do not make the essence of the corresponding technical solution departing from the scope of the embodiments of the present disclosure.

In addition, it should be understood that although this specification is described according to the embodiments, not each embodiment only includes an independent technical solution. This description method of the specification is only for clarity. The skilled in the art should look the specification as a whole, and the technical solutions in each embodiment can also be appropriately combined to form other embodiment that can be understood by those skilled in the art.

What is claimed is:

1. A method of automatic load regulation, operation and protection for steam turbine and motor combined drive and power generation in converter saturated steam utilization, comprising:

step S1: setting a clutch engagement speed in digital electro-hydraulic (DEH) of a steam turbine system, wherein the clutch engagement speed is defined as a turbine speed;

step S2, speed control mode; after regulating the speed to the clutch engagement speed through speed regulation, determining, by the DEH of the steam turbine system, whether a clutch is successfully engaged based on the clutch engagement speed or an opening of a steam inlet main regulating valve; if the clutch is successfully engaged, proceeding to step S3; if not, setting the turbine speed to be lower than the clutch engagement speed, proceeding to step S1;

step S3: switching to a valve control mode after the clutch is successfully engaged, setting an initial valve position of the steam inlet main regulating valve to be 2%-4% higher than the valve position at clutch engagement, at this time, the steam turbine system is successfully started and enters into a valve-position-control-turbine-output-power mode;

step S4: activating a valve position automatic control mode, by activating a function button;

step S5: clicking an "automatic input" function button to enter the valve position automatic control mode to automatically adjust a valve position according to a comprehensive thermal storage index value;

step S6: reducing a valve position adjustment rate;

step S7: automatically adjusting, by the steam turbine, the valve position to achieve a purpose of automatically regulating an output power based on the comprehensive thermal storage index value of a heat storage system:

step S7.1: establishing a hard wiring communication between a programmable logic controller (PLC) of the heat storage system and a distributed control system (DCS) of the steam turbine system, and reading, by the DCS of the steam turbine system, the comprehensive thermal storage index value;

step S7.2: reading, by the DCS of the steam turbine system, a preset valve position corresponding to the comprehensive thermal storage index value;

step S7.3: adjusting the valve position of the steam inlet main regulating valve to the read valve position corresponding to the comprehensive thermal storage index value;

step S7.4: transmitting an output frequency value, an output power value, and a frequency transformer tripping signal of a frequency transformer PLC to the DCS of the steam turbine system through a hard wiring communication; when work done by the steam turbine system exceeds power consumption of a fan, the frequency transformer automatically switches to a power generation mode; when the work done by the steam turbine system is less than the power consumption of the fan, the frequency transformer automatically switches to a power supply mode;

step S8, determining whether a manual function button is clicked, if yes, executing step S9, if not, moving back and executing step S7;

step S9: increasing the valve position adjustment rate;

wherein a converter saturated steam turbine and motor combined driving power generation system to realize the method of automatic load regulation, operation and protection for steam turbine and motor combined drive and power generation in converter saturated steam utilization comprises a converter drum (1), the heat storage system comprising a steam accumulator (2), a steam water separator (3), a steam turbine (4), a gearbox (5), the clutch (6), the fan (7), an asynchronous motor (8), the frequency transformer (9), a condenser (10), and a water pump (11); the converter drum (1), the steam accumulator (2), the steam water separator (3), the steam turbine (4), the condenser (10), and the water pump (11) are connected in sequence through a circulating pipeline, with valve components arranged on corresponding pipelines; the steam turbine (4) is sequentially connected to the gearbox (5), the clutch (6), the fan (7), and the asynchronous motor (8); and the frequency transformer (9) is connected to the asynchronous motor.

2. The method of automatic load regulation, operation and protection for steam turbine and motor combined drive and power generation in converter saturated steam utilization according to claim 1, wherein in step S2, the clutch engagement speed is set to an RPM of 8x+(60-100) of a current fan speed.

3. The method of automatic load regulation, operation and protection for steam turbine and motor combined drive and power generation in converter saturated steam utilization according to claim 2, wherein in step S2, determine successful engagement of the clutch when the turbine speed exceeds the set clutch engagement speed by 2%-5% or the opening of the steam inlet main regulating valve of the steam turbine is between 12%-18%; in step S2, when clutch engagement is not successful, setting the turbine speed to 2%-5% lower than the set clutch engagement speed, and proceeding to step S1.

4. The method of automatic load regulation, operation and protection for steam turbine and motor combined drive and power generation in converter saturated steam utilization according to claim 1, comprising an inlet parameter protection of the steam turbine: in step S3, under the valve control mode, if pressure in front of the steam inlet main regulating valve exceeds a fluctuation range of 0.9-1.1 MPa during a process, sending an alarm; if the pressure in front of the steam inlet main regulating valve exceeds the fluctuation range of 0.8-1.2 MPa, stopping the system automatically.

5. The method of automatic load regulation, operation and protection for steam turbine and motor combined drive and power generation in converter saturated steam utilization according to claim 4, comprising a speed protection of valve control regulation: in step S3, under the valve control mode, if the turbine speed is lower than 2%-5% of the clutch engagement speed, the valve control mode is immediately exited and the speed control mode is returned, the turbine speed is set to 2%-5% of the clutch engagement speed, sending an alarm for clutch failure or automatic shutting down.

6. The method of automatic load regulation, operation and protection for steam turbine and motor combined drive and power generation in converter saturated steam utilization according to claim 1, comprising a rate protection of valve control regulation: in step S4, if the valve position adjustment enters into the valve position automatic control mode, the valve position adjustment rate is reduced by half to prevent regulation oscillation and other unexpected situations from occurring; on the contrary, in step S8, when entering manual mode, the valve position adjustment rate returns to 5% of a regulation rate value.

7. The method of automatic load regulation, operation and protection for steam turbine and motor combined drive and power generation in converter saturated steam utilization according to claim 1, comprising a switching protection of regulation mode: in step S3, the regulation mode is switched to the valve control mode according to a determination of successful clutch engagement; if the clutch fails to engage successfully, the regulation mode is returned to the speed control mode, automatically setting a speed that is 2%-5% lower than a grid speed-clutch engagement speed, canceling an "engaged" state to prevent the system from automatically detecting and setting the "engaged" state again, and then automatically entering the valve control mode again.

8. The method of automatic load regulation, operation and protection for steam turbine and motor combined drive and power generation in converter saturated steam utilization according to claim 7, wherein in step S7, a power-valve position curve is drawn, and a maximum control valve position and a minimum control valve position are set according to the power-valve position curve; then setting 5-8 valve positions, corresponding to 5-8 intervals of the comprehensive thermal storage index value; the maximum control valve position corresponds to a high comprehensive thermal storage index value and the maximum control valve position ensures that the steam turbine is not overloaded; and the minimum control valve position ensures that the turbine speed does not decrease and prevents clutch disengagement.

9. The method of automatic load regulation, operation and protection for steam turbine and motor combined drive and power generation in converter saturated steam utilization according to claim 8, wherein in step S7, an effectiveness judgment whether driving parameters is required to adjust is conducted, that is, after reading the comprehensive thermal storage index value, first determining whether the comprehensive thermal storage index value is between 1.0-1.9 MPa, if yes, subsequent regulation control continues, otherwise the automatic regulation mode is exited, and reporting an error.

10. The method of automatic load regulation, operation and protection for steam turbine and motor combined drive and power generation in converter saturated steam utilization according to claim 9, wherein in step S3, every time the steam turbine is started and enters a "running" state, a power value transmitted by the frequency transformer is read and recorded; after entering the "engaged" state, the recorded power value subtracts a real-time power value transmitted by the frequency transformer to obtain an output power value of the steam turbine, and display this value on the steam turbine as the output power value of the steam turbine.

* * * * *